(12) United States Patent
Underwood et al.

(10) Patent No.: US 12,267,202 B2
(45) Date of Patent: Apr. 1, 2025

(54) SYSTEMS AND METHODS FOR A FRAMEWORK FOR ALGORITHMICALLY IDENTIFYING CRITICAL SOFTWARE SYSTEMS AND APPLICATIONS WITHIN AN ORGANIZATION

(71) Applicant: Capital One Services, LLC, McLean, VA (US)

(72) Inventors: Jonathan Underwood, Leighton Buzzard (GB); David L. Houck, Maidens, VA (US); Naoum Anagnos, Rockville, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/501,522

(22) Filed: Nov. 3, 2023

(65) Prior Publication Data

US 2024/0187300 A1    Jun. 6, 2024

Related U.S. Application Data

(63) Continuation of application No. 18/062,336, filed on Dec. 6, 2022, now Pat. No. 11,811,583.

(51) Int. Cl.
*H04L 41/22* (2022.01)
*H04L 41/0604* (2022.01)

(52) U.S. Cl.
CPC ...... *H04L 41/0627* (2013.01); *H04L 41/0609* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 10,503,553 B1* | 12/2019 | Ashok | G06F 11/3024 |
| 2019/0073276 A1* | 3/2019 | Yuen | G06F 11/3006 |
| 2020/0053175 A1* | 2/2020 | Bodman | H04L 67/01 |
| 2020/0252415 A1* | 8/2020 | Hamdi | G06F 21/577 |
| 2020/0366758 A1* | 11/2020 | Chauhan | H04L 67/1097 |
| 2021/0105181 A1* | 4/2021 | Suzuki | G09G 5/38 |
| 2024/0176651 A1* | 5/2024 | Sethi | G06F 9/4856 |

* cited by examiner

*Primary Examiner* — Joshua Joo
(74) *Attorney, Agent, or Firm* — Foley & Lardner LLP (57) ABSTRACT

Methods and systems generating real-time notifications of software application importance based on current processing requirements. The method includes receiving a first dataset, wherein the first dataset comprises recovery time estimates for processing requirements. The method includes receiving a second dataset, wherein the second dataset comprises second recovery time estimates for applications. The method includes receiving a third dataset, wherein the third dataset comprises dependencies between processing requirements and applications. The method determines many-to-many relationships between the processing requirements and applications based on the dependencies. The method inputs the many-to-many relationships into a machine learning model to identify importance metrics for each application. The method generates, for display on a user interface, a ranking of the applications in order of importance metric.

20 Claims, 4 Drawing Sheets

First Recovery Time Estimates

| Process | Recovery Time Estimate |
|---|---|
| Process 1 | 00:00:00 |
| Process 2 | 00:00:00 |
| Process 3 | 00:00:00 |

212 → | | ← 214

220

Second Recovery Time Estimates

| Application | Recovery Time Estimate |
|---|---|
| Application A | 00:00:00 |
| Application B | 00:00:00 |
| Application C | 00:00:00 |

222 → | | ← 224

230

Dependencies

| Processes | Applications |
|---|---|
| Process 1 | Applications: A, B, C |
| Process 2 | Applications: C, D |
| Process 3 | Applications: D, E, F |

SYSTEMS AND METHODS FOR A FRAMEWORK FOR ALGORITHMICALLY IDENTIFYING CRITICAL SOFTWARE SYSTEMS AND APPLICATIONS WITHIN AN ORGANIZATION

CROSS-REFERENCE TO RELATED APPLICATIONS

This application is a continuation of U.S. patent application Ser. No. 18/062,336 filed Dec. 6, 2022. The content of the foregoing application is incorporated herein in its entirety.

BACKGROUND

Businesses rely on various software applications to ensure efficient operation of various processing requirements. It is becoming more common for organizations to conduct system continuity planning to prepare for unexpected disruptions to system processes. In creating a continuity plan, it is important to know where to best allocate system resources to minimize the consequences of any disruptions. In recent years, the use of artificial intelligence, including, but not limited to, machine learning, deep learning, etc. (referred to collectively herein as artificial intelligence models, machine learning models, or simply models), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is of high quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are generated may be unknown or obscured. This obscurity creates hurdles for identifying errors in the results, as well as for improving the models providing the results. These technical problems present an inherent challenge when attempting to use an artificial intelligence-based solution in determining the importance of a given software application among the many-to-many relationships between the unique technical requirements for each software application and the unique technical requirements for each processing requirement.

SUMMARY

Methods and systems are described herein for novel uses and/or improvements to machine learning applications. As one example, methods and systems are described herein for generating a real-time notification of the importance of a given software application based on current processing requirements.

Existing systems fail to determine how important any given software application is to the overall ecosystem of interrelated applications and computer systems. For example, existing systems fail to consider that system functions or features have unique technical requirements for each software application to prevent a system failure, and each software application has its own technical requirements for preventing processing failures. However, adapting machine learning models for this practical benefit faces several technical challenges, such as how to train a machine learning model to determine the importance of a given software application. This is particularly difficult as there is no existing taxonomy or methodology for training a model to determine the "importance" of a given application. Furthermore, machine learning models require large amounts of high-quality data such that an attempt to generate data based on qualitative metrics such as "importance"), which at best may be created manually, is not suitable for training a model.

To overcome these technical deficiencies in adapting machine learning models for this practical benefit, methods and systems disclosed herein use machine learning to identify a pattern in the many-to-many relationships between system needs and software applications to generate an importance metric for each software application and generate a ranking of the applications based on the importance metrics, which are assigned based on recovery time estimates for software applications and the processing requirements that depend on them. Recovery time estimates present a unique quantitative metric upon which qualitative metrics such as "importance" may be trained. For example, processing requirements and applications use the same standard of measurement for recovery time estimates. Additionally, how critical a processing requirement or application is has a high correlation to the amount of time a processing requirement may function without the application. Finally, both processing requirements and applications are labeled with this metric.

Through the use of this quantitative metric, the deficiencies in adapting machine learning models to this purpose may be overcome. For example, the methods and systems disclosed herein take into account the first recovery time estimate and the second recovery time estimate and, in conjunction with the many-to-many relationships, use a machine learning model to formulate the importance metric used in ranking the software applications. Accordingly, the methods and systems provide a practical benefit of generating a real-time notification of the importance of a given software application based on current processing requirements.

The methods and systems help ensure data loss protection measures are implemented and followed. For example, the methods and systems disclosed herein generate an importance metric that may be useful in determining necessary security measures to implement or maintain. Furthermore, the methods and systems may help with regulatory compliance in that generating the importance metric may involve considering multiple systems implicated in meeting regulatory requirements and thus ensure that baseline standards are met.

In some aspects, methods and systems are designed to generate real-time notifications of software application importance based on current processing requirements in a disparate computer network. The system can receive a first dataset, wherein the first dataset comprises first recovery time estimates, wherein the first recovery time estimates comprise a respective recovery time estimate for a plurality of processing requirements; the system can receive a second dataset, wherein the second dataset comprises second recovery time estimates, wherein the second recovery time estimates comprise a respective recovery time estimate for a plurality of applications; the system can receive a third dataset, wherein the third dataset comprises dependencies between the plurality of processing requirements and the plurality of applications. The system can also determine a set of many-to-many relationships between each of the plurality of processing requirements and each of the plurality of applications based on the dependencies; input the set of many-to-many relationships into a machine learning model to identify respective importance metrics for each of the plurality of applications, wherein machine learning is trained to determine importance metrics based on a number of relationships, in the set of many-to-many relationships, for a given application and a recovery time estimate for the given application; and generate, for display on a user interface of a user device, a ranking of the plurality of applications based on the respective importance metrics.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
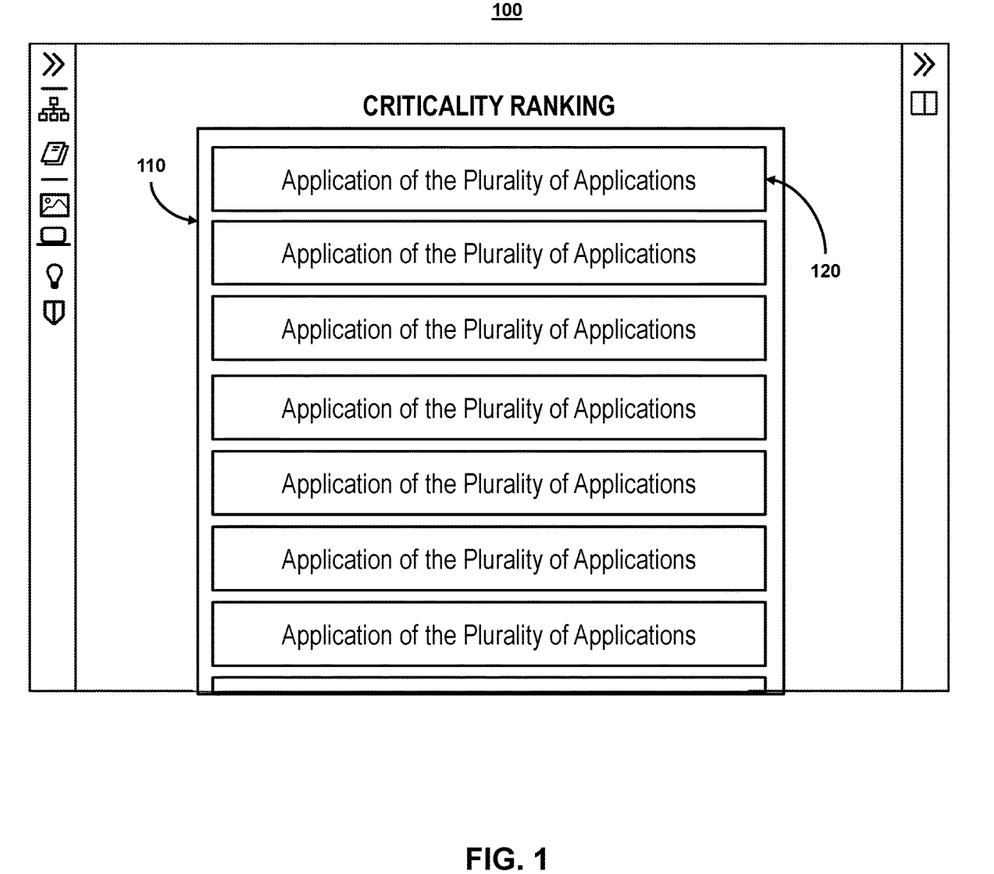
FIG. 1 shows an illustrative user interface for generating a real-time notification of the criticality of a given software application based on current processing requirements, in accordance with one or more embodiments.

FIG. 1 shows an illustrative user interface for generating a real-time notification of the criticality of a given software application, in accordance with one or more embodiments. For example, the system generates user interface 100 in response to the importance metrics generated by the machine learning model. For example, FIG. 1 illustrates the result of leveraging machine learning to identify patterns in the many-to-many relationship between software applications and processing requirements which serve as an input to a machine learning algorithm that can determine an importance metric for a respective application; conventionally, software cannot be dynamically ranked within the context of processing requirements as there is not a real-time solution for assessing the importance of a software application for a processing requirement. As such, the system may achieve the practical benefit of generating a real-time notification of the importance of a given software application based on current processing requirements.

User interface 100 includes the display element 110 and the individual software application listings 120. In some embodiments, user interface 100 may also include other user interface elements such as additional text boxes, additional fields, and other elements. Display element 110 displays the real-time notification of the criticality of a given software application in order of criticality. Each application is represented by the individual software application listing 120. In other embodiments, the system may contain additional points of interaction to allow an end user to access additional information about the software application such as the application-specific recovery time estimate, or system processes which depend on the application.

The system may be used to generate a user interface that displays a real-time ranking of the importance metric of a given software application based on dependencies, many-to-many relationships between software applications and processing requirements. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, an "importance metric" may comprise any quantitative or qualitative assessment of an importance of a given value. For example, the importance metric may refer to the importance of a given processing request, application, etc. In some embodiments, the importance metric may include a numerical value generated by a machine learning algorithm that assigns a value to an application that may be used for system continuity planning purposes. In some embodiments, the importance metric may comprise an estimate based on the recovery time estimate as well as the number of many-to-many relationships between the software application and the processing requirements.

In some embodiments, the system may determine an importance metric by performing an assessment of confidentiality. As referred to herein, "confidentiality" may comprise ensuring restrictions on access of information. For example, a system may have a high confidentiality rating if the system deals with highly sensitive information such as databases that include social security numbers. The system may have a high confidentiality rating if the system contains data that may have severe or catastrophic adverse effects on processing requirements.

In some embodiments, the system may determine an importance metric by performing an assessment of integrity. As referred to herein, "integrity" may comprise ensuring only authorized individuals can modify or destroy information. Integrity may also include ensuring information non-repudiation and authenticity. For example, a system may have a moderate integrity rating if the system deals with moderately sensitive information such as databases that include usernames. The system may have a moderate integrity rating if the system contains data that may have a serious adverse effect on processing requirements.

In some embodiments, the system may determine an importance metric by performing an assessment of availability. As referred to herein, "availability" may comprise ensuring timely and reliable access to and use of information. For example, a system may have a low availability rating if the system deals with low sensitivity information such as information that is scheduled for public release. The system may have a low availability rating if the system contains data that may have limited adverse effect on processing requirements.

In some embodiments, the system may determine an importance metric by executing chaos testing. As referred to herein, "chaos testing" may comprise intentionally disrupting a processing requirement and then measuring the impact of dependent services. For example, a system may lead the system to discover a high recovery time, or an unexpected vulnerability thus impacting the importance metric calculation.

In some embodiments, the system may determine an importance metric by assessing response time to beacons. For example, the system may determine a first response time attributed to the time it takes for an application serving the plurality of processing requirements to respond to a beacon. For example, an application that takes a long time to respond to a beacon may have a higher importance metric as it would take longer for the application to complete processing requirements due to the long response time. Subsequently, the application may have a higher ranking. By doing so, the system may generate a more accurate importance metric, resulting in a more accurate ranking.

In some embodiments, the system may determine an importance metric by performing health checks at regular intervals. For example, the system may assess the availability, performance or security vulnerabilities of an application serving the plurality of processing requirements. For example, an application that has an unreliable availability, low performance and one or more security vulnerabilities may have a higher importance metric as it would further degrade the usefulness if the application was inaccessible. Subsequently, the application may have a higher ranking. By doing so, the system may generate a more accurate importance metric, resulting in a more accurate ranking.

In some embodiments, identifying importance metrics includes determining the computer processing unit workload attributed to computation processes. For example, the system may determine a first computer processing unit ("CPU") workload attributed to computation processes executed by the first application when serving the plurality of processing requirements and weigh the first CPU workload to determine the first importance metric. For example, an application requiring a large amount of computing power and thus contributing to a high CPU workload may have a higher importance metric and, subsequently, a higher ranking. By doing so, the system may generate a more accurate importance metric, resulting in a more accurate ranking.

In some embodiments, identifying importance metrics includes determining the amount of traffic on a network. For example, the system may determine a first amount of traffic on a network attributed to computational processes executed by the first application when serving the plurality of processing requirements and weigh the first amount of traffic on a network to determine the first importance metric. For example, a processing requirement utilizing a large portion of network bandwidth may have a longer recovery time estimate, which may inform the importance metrics for the associated software applications. By doing so, the system may generate a more accurate importance metric for associated software applications, resulting in a more accurate ranking.

In some embodiments, identifying importance metrics includes determining the route of network traffic for specific computational processes. For example, the system may determine a first route of network traffic attributed to computational processes executed by the first application when serving the plurality of processing requirements and weigh the first route of network traffic to determine the first importance metric. For example, if a software application relies on multiple paths in a network to accomplish a processing requirement or takes a route that is inefficient, the software application may have a longer recovery time estimate, which may inform the associated importance metric. By doing so, the system may generate a more accurate importance metric, resulting in a more accurate ranking.

In some embodiments, identifying importance metrics includes determining the maximum allowable latency for a respective software application serving a processing requirement. For example, the system may determine a first maximum allowable latency for the first application when serving the plurality of processing requirements and weigh the first maximum allowable latency to determine the first importance metric. For example, if a software application is delayed in sending necessary packets to accomplish a processing requirement, the software application may have a longer recovery time estimate, which may inform the associated importance metric. By doing so, the system may generate a more accurate importance metric, resulting in a more accurate ranking.

In some embodiments, identifying importance metrics includes determining the rate of inputs and outputs for a respective software application serving a processing requirement. For example, the system may determine a first rate of input and output for the first application when serving the plurality of processing requirements and weigh the first rate of input and output to determine the first importance metric. For example, if a software application has a low input and output rate, the software application may have a longer recovery time estimate, which may inform the associated importance metric. By doing so, the system may generate a more accurate importance metric, resulting in a more accurate ranking.

As referred to herein, a "recovery time estimate" may comprise a maximal time allotment that one or more processing requirements or software applications can remain non-operational; the recovery time estimate is used to generate the importance metric. In some embodiments, the recovery time estimate used to generate the importance metric may comprise an estimate based on factors such as computer processing unit ("CPU") workload, the amount of network traffic, software application latency, or input and output speeds.

As referred to herein, a "dependency" may include the reliance on a software application by a system process. In some embodiments, the dependency may comprise a group of applications that are necessary for a system process. Alternatively or additionally, the dependency may comprise a group of processing requirements that are served by an application. As referred to herein, a "many-to-many relationship" may include the relationship between many software applications and many system processes.

As referred to herein, a "processing requirement" may comprise any requirement of a system, enterprise, and/or computer network. In some embodiments, the processing requirement may include an action that can be performed by a business. In some embodiments, the processing requirement may comprise a business need or a business process. Additionally or alternatively, the processing requirement may comprise feature or function (e.g., website functionality, system processing functionality, etc.) used to support a business need or a business process.

Figure 2:
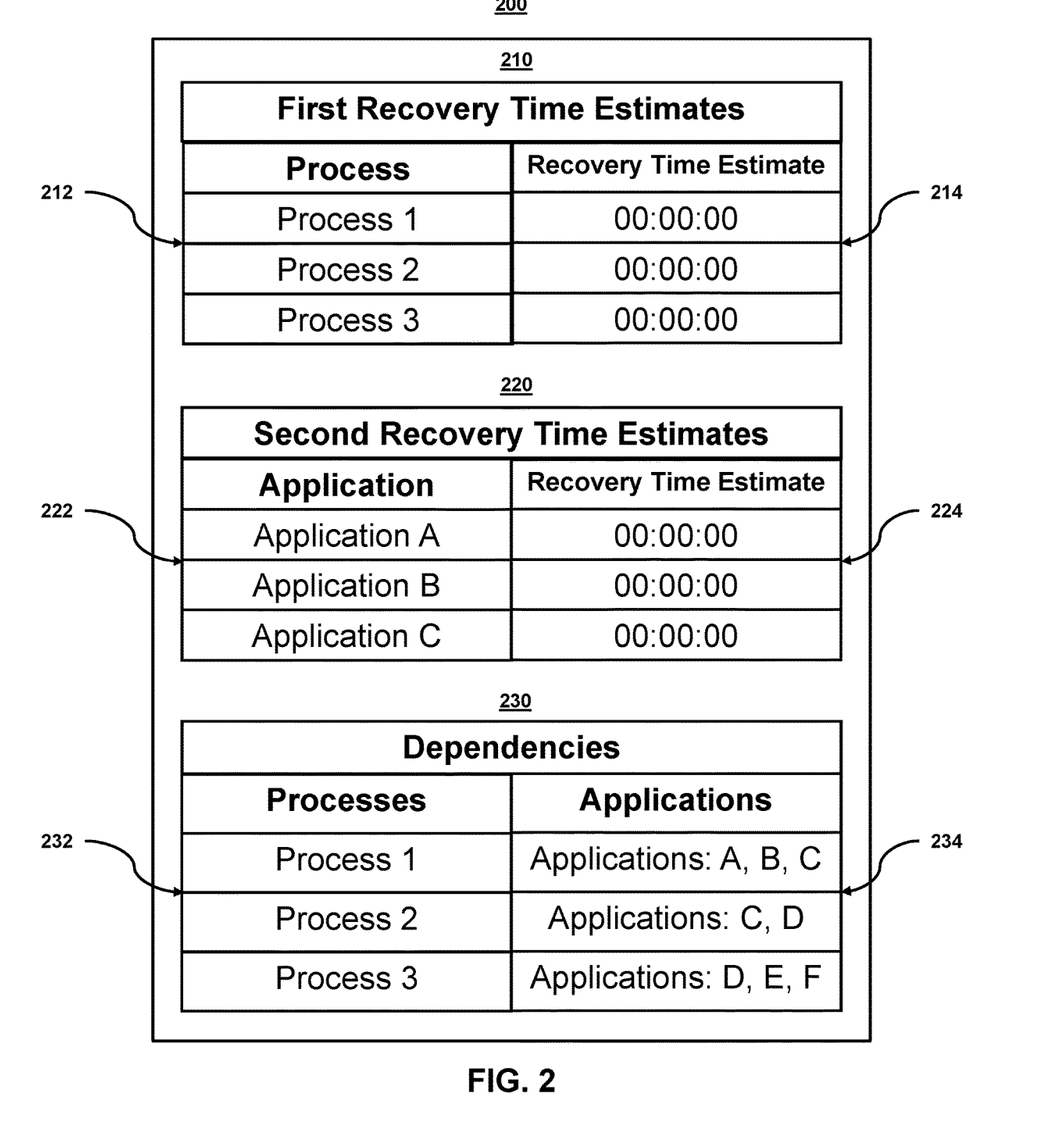
FIG. 2 shows three databases used to store recovery time estimates for various software applications, various processing requirements, and various dependencies, in accordance with one or more embodiments.

FIG. 2 shows an illustrative architecture 200, in accordance with one or more embodiments. For example, illustrative architecture 200 includes one or more datasets that store recovery time estimates for various processing requirements 210, various software applications 220, and various dependencies 230 which are used in generating the importance metric.

Conventionally, a dataset comprising the first recovery time estimate, a dataset comprising the second recovery time estimate, and a dataset comprising a third recovery time estimate are not used together as an input for a machine learning model to generate an importance metric for certain software applications.

Illustrative architecture 200 includes three datasets, 210, 220, and 230. Each of the datasets includes two columns. In dataset 210, column 212 comprises system processes and column 214 comprises the corresponding recovery time estimate. In dataset 220, column 222 comprises software applications and column 224 comprises the corresponding recovery time estimate. In dataset 230, column 232 comprises system processes and column 234 comprises applications necessary for the corresponding system process.

Figure 3:
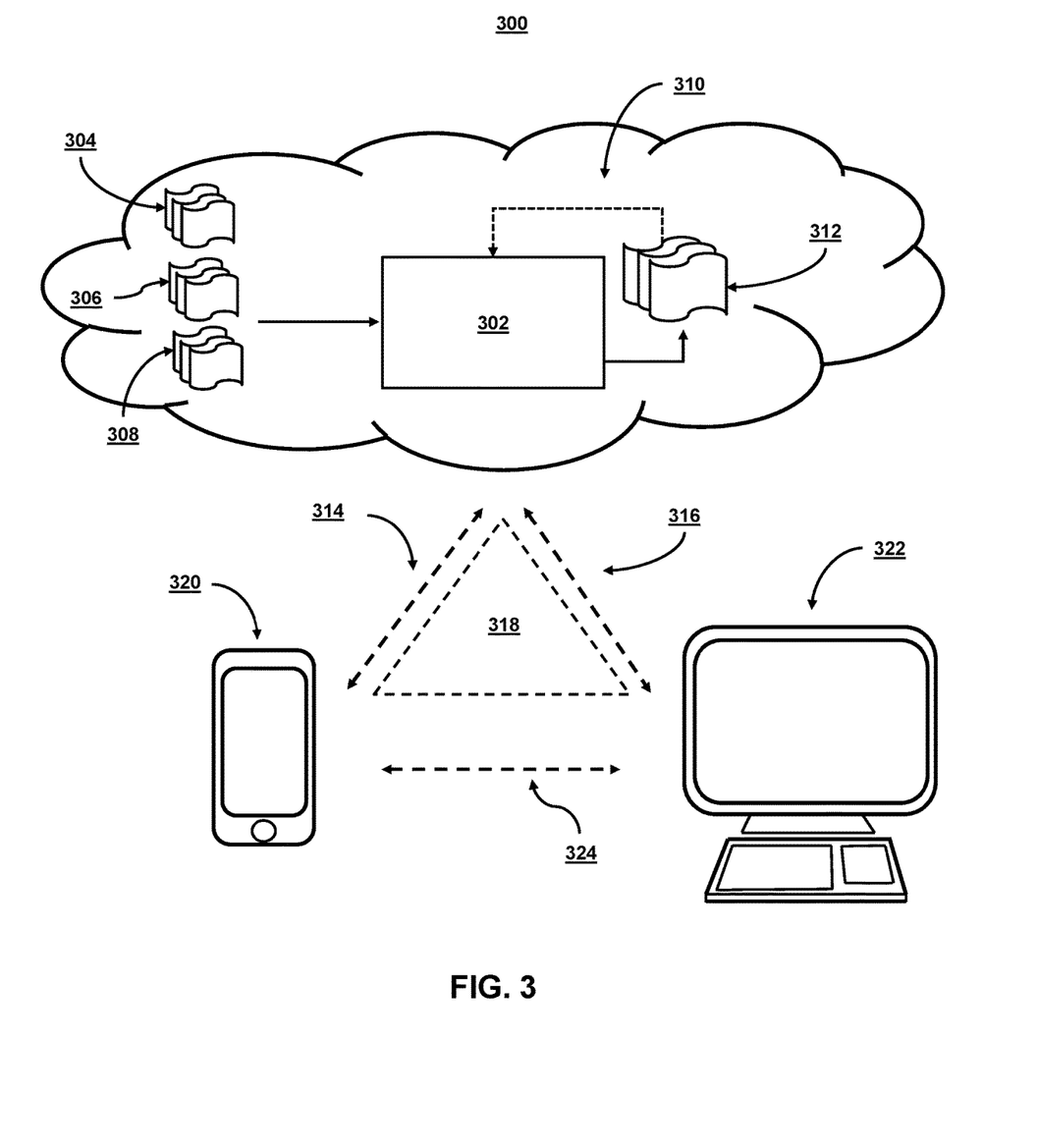
FIG. 3 shows an illustrative architecture for using machine learning to identify a pattern in the many-to-many relationships to generate an importance metric for each software application, in accordance with one or more embodiments.

FIG. 3 shows illustrative components for a system used to generate a real-time notification of the importance metric of a given software application based on current processing requirements, in accordance with one or more embodiments. For example, FIG. 3 may show illustrative components for generating an importance metric used to rank software applications based on current processing requirements. As shown in FIG. 3, system 300 may include mobile device 320 and user terminal 322. While shown as a smartphone and a personal computer, respectively, in FIG. 3, it should be noted that mobile device 320 and user terminal 322 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 320, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 320, user terminal 322, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 320 and user terminal 322 include a display upon which to display data (e.g., conversational responses, queries, and/or notifications).

Additionally, as mobile device 320 and user terminal 322 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 314, 316, and 324. Communication paths 314, 316, and 324 may include the Internet, a mobile phone network, a mobile voice or data network (e.g., a 5G or LTE network), a cable network, a public switched telephone network, or other types of communications networks or combinations of communications networks. Communication paths 314, 316, and 324 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include the first dataset, wherein the first dataset comprises first recovery time estimates, wherein the first recovery time estimates comprise a respective recovery time estimate for a plurality of processing requirements. Cloud components 310 may also include a second dataset, wherein the second dataset comprises second recovery time estimates, wherein the second recovery time estimates comprise a respective recovery time estimate for a plurality of applications. Cloud components 310 may also include a third dataset, wherein the third dataset comprises dependencies between the plurality of processing requirements and the plurality of applications.

Cloud components 310 may access the first, second, and third datasets in order to leverage the machine learning algorithm to output an importance metric used to rank applications. Cloud components 310 may include model 302, which may be a machine learning model, an artificial intelligence model, etc. (which may be referred to collectively as "models" herein). Model 302 may take inputs 304, 306, and 308 and provides outputs 312. The inputs may include multiple datasets, such as a training dataset and a test dataset. Each of the plurality of datasets (e.g., inputs 304, 306, 308) may include data subsets related to user data, predicted forecasts and/or errors, and/or actual forecasts and/or errors. In some embodiments, outputs 312 may be fed back to model 302 as input to train model 302 (e.g., alone or in conjunction with user indications of the accuracy of outputs 312, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., if an application is required for multiple system processes, the importance metric will result in a higher ranking than an application that is required for only one system process).

For example, the system may need to process a dataset that has (among others) a categorical variable with many levels and further attributes associated with each level (e.g., a plurality of applications). The system may aggregate the information provided by the datasets. The aggregation of these datasets produces a large number of columns. The number of columns produced by the data aggregation can be reduced by employing bilevel optimization. "Bilevel optimization" may comprise a system that solves a problem comprising an upper-level optimization task that encompasses a lower-level optimization task. An upper-level optimization problem may include determining the importance metric. A lower-level optimization problem may include determining the recovery time estimates for processing requirements and software applications.

In a variety of embodiments, model 302 may update its configurations (e.g., weights, biases, or other parameters) based on the assessment of its prediction (e.g., outputs 312) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether a given input corresponds to a classification of model 302 (e.g., one classification may be high reliance whereby many system processes rely on a specific application; another classification may be low reliance whereby very few system processes rely on a specific application).

In some embodiments, the model (e.g., model 302) may automatically perform actions based on outputs 312. In some embodiments, the model (e.g., model 302) may not perform any actions. The output of the model (e.g., model 302), the importance metric, may be used in ranking applications based on their importance to system processes.

System 300 also includes API layer 318. API layer 318 may allow the system to generate summaries across different devices. In some embodiments, API layer 318 may be implemented on mobile device 320 or user terminal 322. Alternatively or additionally, API layer 318 may reside on one or more of cloud components 310. API layer 318 (which may be a REST or Web services API layer) may provide a decoupled interface to data and/or functionality of one or more applications. API layer 318 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PUP, and JavaScript. SOAP Web services have traditionally been adopted in the enterprise for publishing internal services, as well as for exchanging information with partners in B2B transactions.

API layer 318 may use various architectural arrangements. For example, system 300 may be partially based on API layer 318, such that there is strong adoption of SOAP and RESTful Web services, using resources like Service Repository and Developer Portal, but with low governance, standardization, and separation of concerns. Alternatively, system 300 may be fully based on API layer 318, such that separation of concerns between layers like API layer 318, services, and applications are in place.

In some embodiments, the system architecture may use a microservice approach. Such systems may use two types of layers: front-end layer and back-end layer, where microservices reside. In this kind of architecture, the role of the API layer 318 may provide integration between the front-end and back-end layers. In such cases, API layer 318 may use RESTful APIs (exposition to front-end or even communication between microservices). API layer 318 may use AMQP (e.g., Kafka, RabbitMQ, etc.). API layer 318 may use incipient usage of new communications protocols such as gRPC, Thrift, etc.

In some embodiments, the system architecture may use an open API approach. In such cases, API layer 318 may use commercial or open source API platforms and their modules. API layer 318 may use a developer portal. API layer 318 may use strong security constraints applying WAF and DDoS protection, and API layer 318 may use RESTful APIs as standard for external integration.

Figure 4:
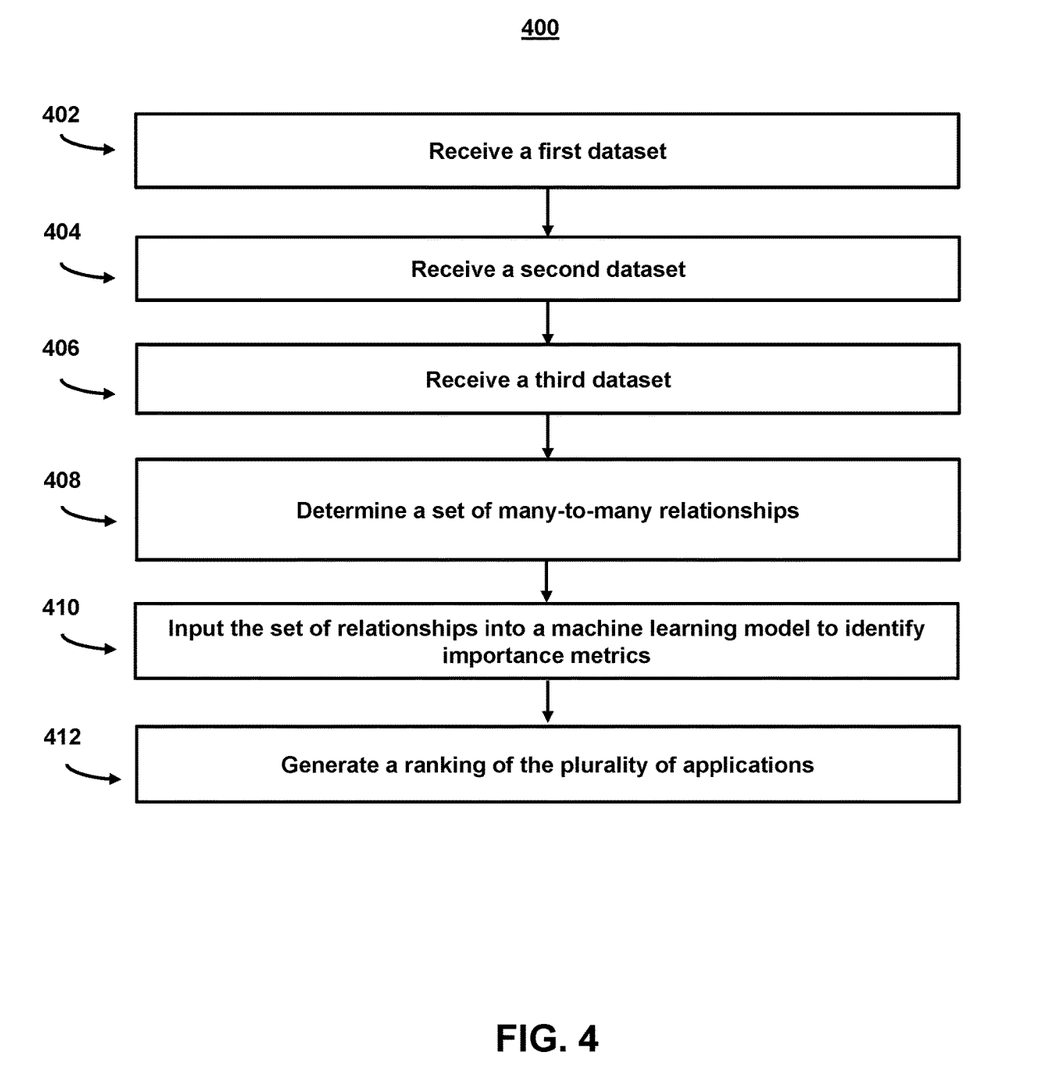
FIG. 4 shows a flowchart of the steps involved in generating real-time notification of the importance of a given software application based on current processing requirements, in accordance with one or more embodiments.

FIG. 4 shows a flowchart of the steps involved in using machine learning to identify a pattern in the many-to-many relationship to generate an importance metric for software applications, in accordance with one or more embodiments. For example, the system may use process 400 (e.g., as implemented on one or more system components described above) in order to generate a real-time notification of the importance of a given software application based on current processing requirements.

At step 402, process 400 (e.g., using one or more components described above) receives a first dataset. For example, the system may receive a first dataset, wherein the first dataset comprises first recovery time estimates, wherein the first recovery time estimates comprise a respective recovery time estimate for a plurality of processing requirements. The first dataset may comprise a set of system processes and associated recovery time estimates. The first dataset may be used as an input to a machine learning model to generate an importance metric used to rank software applications. By doing so, the system may use the recovery time estimate of system processes in determining the importance metric for various software applications.

In some embodiments, receiving a first dataset includes determining the maximal time allotment that a processing requirement can remain non-operational due to network connectivity interruptions. For example, the system may determine the maximal time allotment that one or more of the plurality of processing requirements can remain non-operational due to network connectivity interruptions. For example, the first recovery time estimate may consider the case where network connectivity interruptions interfere with a processing requirement. By doing so, the dataset may generate a more accurate first recovery time estimate.

In some embodiments, receiving a first dataset includes determining the maximal time allotment that a processing requirement can remain non-operational due to power interruptions. For example, the system may determine the maximal time allotment that one or more of the plurality of processing requirements can remain non-operational due to power interruptions. For example, the first recovery time estimate may consider the case where power interruptions interfere with a processing requirement. By doing so, the dataset may generate a more accurate first recovery time estimate.

At step 404, process 400 (e.g., using one or more components described above) receives a second dataset. For example, the system may receive a second dataset, wherein the second dataset comprises second recovery time estimates, wherein the second recovery time estimates comprise a respective recovery time estimate for a plurality of applications. The second dataset may comprise a set of software applications and associated recovery time estimates. The second dataset may be used as an input to a machine learning model to generate an importance metric used to rank software applications. By doing so, the system may use the recovery time estimate of software applications in determining the importance metric for various software applications.

In some embodiments, receiving a second dataset includes determining the maximal time allotment that an application can remain non-operational due to network connectivity interruptions. For example, the system may determine the maximal time allotment that one or more applications can remain non-operational due to network connectivity interruptions. For example, the first recovery time estimate may consider the case where network connectivity interruptions interfere with an application. By doing so, the dataset may generate a more accurate second recovery time estimate.

In some embodiments, receiving a second dataset includes determining the maximal time allotment that an application can remain non-operational due to power interruptions. For example, the system may determine the maximal time allotment that one or more applications can remain non-operational due to power interruptions. For example, the first recovery time estimate may consider the case where power interruptions interfere with an application. By doing so, the dataset may generate a more accurate second recovery time estimate.

At step 406, process 400 (e.g., using one or more components described above) receives a third dataset. For example, the system may receive a third dataset, wherein the third dataset comprises dependencies between the plurality of processing requirements and the plurality of applications. The third dataset may comprise a set of processing requirements and the associated necessary software applications. The third dataset may be used as an input to a machine learning model to generate an importance metric used to rank software applications. By doing so, the system may use the dependencies in determining the importance metric for various software applications.

At step 408, process 400 (e.g., using one or more components described above) determines a set of many-to-many relationships. For example, the system may determine a set of many-to-many relationships between each of the plurality of processing requirements and each of the plurality of applications based on the dependencies. The set of many-to-many relationships includes a mapping of applications to specific processing requirements which may be used as an input in a machine learning model to rank software applications. By doing so, the system may use the many-to-many relationships in conjunction with the importance metric to rank software applications.

In some embodiments, determining a set of many-to-many relationships includes querying software applications and processing requirements to determine the plurality of processing requirements served by a respective application and the plurality of applications relied on by a processing requirement. For example, the system may query each of the plurality of applications to determine the one or more of the plurality of processing requirements served by a respective application of the plurality of applications and query each of the plurality of processing requirements to determine the one or more of the plurality of applications relied on by a respective processing requirement of the plurality of processing requirements. For example, the set of many-to-many relationships may involve querying both the plurality of processing requirements and the plurality of applications to discover dependencies. By doing so, the system may generate a more complete set of many-to-many relationships.

At step 410, process 400 (e.g., using one or more components described above) inputs the set of relationships into a machine learning model to identify importance metrics. For example, the system may input the set of many-to-many relationships into a machine learning model to identify respective importance metrics for each of the plurality of applications, wherein machine learning is trained to determine importance metrics based on a number of relationships, in the set of many-to-many relationships, for a given application and a recovery time estimate for the given application. The machine learning model may output the importance metric of a specific set of software applications. The importance metric generated by the machine learning model may be used to rank software applications. By doing so, the system may generate a ranking based on the importance metric determined by the machine learning model.

At step 412, process 400 (e.g., using one or more components described above) generates a ranking of the plurality of applications. For example, the system may generate for display, on a user interface of a user device, a ranking of the plurality of applications based on the respective importance metrics. The ranking of the plurality of applications can help prioritize resource allocation to minimize damages resulting from downtime of a software application. By doing so, the system may help provide a user interface for end users to quickly assess the importance of an application within the scope of system processes.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a first dataset, wherein the first dataset comprises first recovery time estimates, wherein the first recovery time estimates comprise a respective recovery time estimate for a plurality of processing requirements; receiving a second dataset, wherein the second dataset comprises second recovery time estimates, wherein the second recovery time estimates comprise a respective recovery time estimate for a plurality of applications; receiving a third dataset, wherein the third dataset comprises dependencies between the plurality of processing requirements and the plurality of applications; determining a set of many-to-many relationships between each of the plurality of processing requirements and each of the plurality of applications based on the dependencies; inputting the set of many-to-many relationships into a machine learning model to identify respective importance metrics for each of the plurality of applications, wherein machine learning is trained to determine importance metrics based on a number of relationships, in the set of many-to-many relationships, for a given application and a recovery time estimate for the given application; and generating for display, on a user interface of a user device, a ranking of the plurality of applications based on the respective importance metrics.

2. The method of the preceding embodiment generating real-time notifications of software application importance based on current processing requirements in a disparate computer network.

3. The method of any one of the preceding embodiments, wherein identifying respective importance metrics comprises: determining a first importance metric for a first application of the plurality of applications by: determining a first number of relationships for the first application in the set of many-to-many relationships; determining a first recovery time estimate for the first application; and weighing the first number of relationships and the first recovery time estimate to determine the first importance metric.

4. The method of any one of the preceding embodiments, wherein weighing the first number of relationships and the first recovery time estimate to determine the first importance metric further comprises: determining a first ranking of the first application among the plurality of applications based on comparing the first number of relationships to a respective number of relationships for other applications of the plurality of applications; and determining a second ranking of the first application among the plurality of applications based on comparing the first recovery time estimate to respective recovery time estimates for the other applications.

5. The method of any one of the preceding embodiments, wherein identifying respective importance metrics comprises: determining a first importance metric for a first application of the plurality of applications by: determining a first computer processing unit ("CPU") workload attributed to computational processes executed by the first application when serving the plurality of processing requirements; and weighing the first CPU workload to determine the first importance metric.

6. The method of any one of the preceding embodiments, wherein identifying respective importance metrics comprises: determining a first importance metric for a first application of the plurality of applications by: determining a first amount of traffic on a network attributed to computational processes executed by the first application when serving the plurality of processing requirements; and weighing the first amount of traffic on a network to determine the first importance metric.

7. The method of any one of the preceding embodiments, wherein identifying respective importance metrics comprises: determining a first importance metric for a first application of the plurality of applications by: determining a first route of network traffic attributed to computational processes executed by the first application when serving the plurality of processing requirements; and weighing the first route of network traffic to determine the first importance metric.

8. The method of any one of the preceding embodiments, wherein identifying respective importance metrics comprises: determining a first importance metric for a first application of the plurality of applications by: determining a first maximum allowable latency for the first application when serving the plurality of processing requirements; and weighing the first maximum allowable latency to determine the first importance metric.

9. The method of any one of the preceding embodiments, wherein identifying respective importance metrics comprises: determining a first importance metric for a first application of the plurality of applications by: determining a first rate of input and output for the first application when serving the plurality of processing requirements; and weighing the first rate of input and output to determine the first importance metric.

10. The method of any one of the preceding embodiments, wherein the first recovery time estimates comprise a maximal time allotment that one or more of the plurality of processing requirements can remain non-operational due to network connectivity interruptions, and wherein the second recovery time estimate comprises a maximal time allotment that one or more applications can remain non-operational due to the network connectivity interruptions.

11. The method of any one of the preceding embodiments, wherein the first recovery time estimates comprise a maximal time allotment that one or more of the plurality of processing requirements can remain non-operational due to power interruptions, and wherein the second recovery time estimate comprises a maximal time allotment that one or more applications can remain non-operational due to the power interruptions.

12. The method of any one of the preceding embodiments, further comprising determining the dependencies between the plurality of processing requirements and the plurality of applications by: querying each of the plurality of applications to determine the one or more of the plurality of processing requirements served by a respective application of the plurality of applications; and querying each of the plurality of processing requirements to determine the one or more of the plurality of applications relied on by a respective processing requirement of the plurality of processing requirements.

13. A tangible, non-transitory, machine-readable medium storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system of generating real-time notifications of software application importance based on current processing requirements in a disparate computer network, the system comprising:
   one or more processors; and
   a non-transitory computer readable medium having instructions recorded thereon that when executed by the one or more processors cause operations comprising:
      receiving a first dataset, wherein the first dataset comprises first amount of traffic, wherein the first amount of traffic comprise a respective amount of traffic for a plurality of processing requirements;
      receiving a second dataset, wherein the second dataset comprises second amount of traffic, wherein the second amount of traffic comprise a respective amount of traffic for a plurality of applications;
      receiving a third dataset, wherein the third dataset comprises dependencies between the plurality of processing requirements and the plurality of applications, wherein the dependencies are determined by querying each of the plurality of applications to determine one or more of the plurality of processing requirements served by a respective application of the plurality of applications and by querying each of the plurality of processing requirements to determine one or more of the plurality of applications relied on by a respective processing requirement of the plurality of processing requirements;
      determining a set of many-to-many relationships between each of the plurality of processing requirements and each of the plurality of applications based on the dependencies;
      inputting the set of many-to-many relationships into a model to identify respective importance metrics for each of the plurality of applications, wherein machine learning is trained to determine importance metrics based on a number of relationships, in the set of many-to-many relationships, for a given application and a amount of traffic for the given application; and
      generating for display, on a user interface of a user device, a ranking of the plurality of applications based on the respective importance metrics.

2. A method of generating real-time notifications of software application importance based on current processing requirements in a disparate computer network, the method comprising:
   receiving a first data set, wherein the first data set comprises a first amount of traffic attributed to computational processes executed by a plurality of applications, wherein the first amount of traffic comprises a respective amount of traffic amount of traffic for a plurality of processing requirements;
   receiving a second data set, wherein the second data set comprises second amount of traffic, wherein the second amount of traffic comprise a respective amount of traffic for a plurality of applications;
   receiving a third dataset, wherein the third dataset comprises dependencies between the plurality of processing requirements and the plurality of applications;
   determining a set of many-to-many relationships between each of the plurality of processing requirements and each of the plurality of applications based on the dependencies;

inputting the set of many-to-many relationships into a model to identify respective importance metrics for each of the plurality of applications, wherein machine learning is trained to determine importance metrics based on a number of relationships, in the set of many-to-many relationships, for a given application and a amount of traffic for the given application; and generating for display, on a user interface of a user device, a ranking of the plurality of applications based on the respective importance metrics.

3. The method of claim 2, wherein identifying respective importance metrics comprises:
determining a first importance metric for a first application of the plurality of applications by:
determining a first number of relationships for the first application in the set of many-to-many relationships;
determining a first amount of traffic for the first application; and
weighing the first number of relationships and the first amount of traffic to determine the first importance metric.

4. The method of claim 3, wherein weighing the first number of relationships and the first amount of traffic to determine the first importance metric further comprises:
determining a first ranking of the first application among the plurality of applications based on comparing the first number of relationships to respective number of relationships for other applications of the plurality of applications; and
determining a second ranking of the first application among the plurality of applications based on comparing the first amount of traffic to respective amount of traffic for the other applications.

5. The method of claim 2, wherein identifying respective importance metrics comprises:
determining a first importance metric for a first application of the plurality of applications by:
determining a first computer processing unit ("CPU") workload attributed to computational processes executed by the first application when serving the plurality of processing requirements; and
weighing the first CPU workload to determine the first importance metric.

6. The method of claim 2, wherein identifying respective importance metrics comprises:
determining a first importance metric for a first application of the plurality of applications by:
determining a recovery time estimates on a network attributed to computational processes executed by the first application when serving the plurality of processing requirements; and
weighing the recovery time estimates to determine the first importance metric.

7. The method of claim 2, wherein identifying respective importance metrics comprises:
determining a first importance metric for a first application of the plurality of applications by:
determining first amount of traffic, wherein the first amount of traffic comprise a respective amount of traffic for the plurality of processing requirements; and
weighing the first amount of traffic to determine the first importance metric.

8. The method of claim 7, wherein the first amount of traffic comprise a maximal time allotment that one or more of the plurality of processing requirements can remain non-operational due to network connectivity interruptions, and wherein the second amount of traffic comprises a maximal time allotment that one or more applications can remain non-operational due to the network connectivity interruptions.

9. The method of claim 7, wherein the first amount of traffic comprise a maximal time allotment that one or more of the plurality of processing requirements can remain non-operational due to power interruptions, and wherein the second amount of traffic comprises a maximal time allotment that one or more applications can remain non-operational due to the power interruptions.

10. The method of claim 2, wherein identifying respective importance metrics comprises:
determining a first importance metric for a first application of the plurality of applications by:
determining a first maximum allowable latency for the first application when serving the plurality of processing requirements; and
weighing the first maximum allowable latency to determine the first importance metric.

11. The method of claim 2, wherein identifying respective importance metrics comprises:
determining a first importance metric for a first application of the plurality of applications by:
determining a first rate of read and write operations for the first application when serving the plurality of processing requirements; and
weighing the first rate of read and write operations to determine the first importance metric.

12. The method of claim 2, further comprising:
determining the dependencies between the plurality of processing requirements and the plurality of applications by:
querying each of the plurality of applications to determine one or more of the plurality of processing requirements served by a respective application of the plurality of applications; and
querying each of the plurality of processing requirements to determine one or more of the plurality of applications relied on by a respective processing requirement of the plurality of processing requirements.

13. A non-transitory computer readable medium having instructions recorded thereon that when executed by one or more processors cause operations comprising:
receiving a first data set, wherein the first data set comprises first amount of traffic, wherein the first amount of traffic comprise a respective amount of traffic for a plurality of processing requirements;
receiving a second dataset, wherein the second dataset comprises second amount of traffic, wherein the second amount of traffic comprise a respective amount of traffic for a plurality of applications;
receiving a third dataset, wherein the third dataset comprises a dependencies between the plurality of processing requirements and the plurality of applications;
determining a set of many-to-many relationships between each of the plurality of processing requirements and each of the plurality of applications based on the dependencies;
inputting the set of many-to-many relationships into a model to identify respective importance metrics for each of the plurality of applications, wherein machine learning is trained to determine importance metrics based on a number of relationships, in the set of many-to-many relationships, for a given application and a amount of traffic for the given application; and generating for display, on a user interface of a user device, a ranking of the plurality of applications based on the respective importance metrics.

14. The non-transitory computer readable medium of claim 13, wherein identifying respective importance metrics comprises:
   determining a first importance metric for a first application of the plurality of applications by:
      determining a first number of relationships for the first application in the set of many-to-many relationships;
      determining a first amount of traffic for the first application; and
      weighing the first number of relationships and the first amount of traffic to determine the first importance metric.

15. The non-transitory computer readable medium of claim 14, wherein weighing the first number of relationships and the first amount of traffic to determine the first importance metric further comprises:
   determining a first ranking of a first application among the plurality of applications based on comparing the first number of relationships to respective number of relationships for other applications of the plurality of applications; and
   determining a second ranking of the first application among the plurality of applications based on comparing the first amount of traffic to respective amount of traffic for the other applications.

16. The non-transitory computer readable medium of claim 13, wherein identifying respective importance metrics comprises:
   determining a first importance metric for a first application of the plurality of applications by:
      determining a first rate of read and write operations for the first application when serving the plurality of processing requirements; and
      weighing the first rate of read and write operations to determine the first importance metric.

17. The non-transitory computer readable medium of claim 13, wherein identifying respective importance metrics comprises:
   determining a first importance metric for a first application of the plurality of applications by:
      determining a first computer processing unit ("CPU") workload attributed to computational processes executed by the first application when serving the plurality of processing requirements; and
      weighing the first CPU workload to determine the first importance metric.

18. The non-transitory computer readable medium of claim 13, wherein determining the dependencies between the plurality of processing requirements and the plurality of applications by:
   querying each of the plurality of applications to determine one or more of the plurality of processing requirements served by a respective application of the plurality of applications; and
   querying each of the plurality of processing requirements to determine one or more of the plurality of applications relied on by a respective processing requirement of the plurality of processing requirements.

19. The non-transitory computer readable medium of claim 13, wherein identifying respective importance metrics comprises:
   determining a first importance metric for a first application of the plurality of applications by:
      determining a first maximum allowable latency for the first application when serving the plurality of processing requirements; and
      weighing the first maximum allowable latency to determine the first importance metric.

20. The non-transitory computer readable medium of claim 13, wherein identifying respective importance metrics comprises:
   determining a first importance metric for a first application of the plurality of applications by:
      determining first recovery time estimates, wherein the first recovery time estimates comprise a respective recovery time estimate for the plurality of processing requirements; and
      weighing the first recovery time estimates to determine the first importance metric.

* * * * *